United States Patent [19]

Roland

[11] Patent Number: 4,983,883
[45] Date of Patent: Jan. 8, 1991

[54] AUTOMATIC ILLUMINATION CIRCUIT

[76] Inventor: George R. Roland, 42100 Riggs, Belleville, Mich. 48111

[21] Appl. No.: 333,115

[22] Filed: Apr. 4, 1989

[51] Int. Cl.$^5$ .............................................. B60Q 1/02
[52] U.S. Cl. ........................................ 315/77; 315/82; 307/10.8
[58] Field of Search .................... 315/80, 82, 83, 77, 315/90; 307/10 LS, 10.1, 10.8

[56] References Cited

U.S. PATENT DOCUMENTS

| | | | |
|---|---|---|---|
| 3,039,020 | 6/1962 | Sargent | 315/80 |
| 3,702,415 | 11/1972 | Schultz | 315/82 |
| 3,832,597 | 8/1974 | Mitchell | 315/82 |
| 3,876,904 | 4/1975 | Weber Jr. | 315/82 X |
| 4,831,310 | 5/1989 | Heintzberger et al. | 315/77 |

OTHER PUBLICATIONS

L.O.F.S. (Light On For Safety) Installation Instructions-(Cummins Electronics Co. Inc., 1-1-88).

Primary Examiner—Eugene R. LaRoche
Assistant Examiner—Ali Neyzari
Attorney, Agent, or Firm—Brooks & Kushman

[57] ABSTRACT

An automatic illumination circuit (36) coupled to an ignition switch (14) of an automotive vehicle and to at least one light switch (24) therein. The circuit (36) continuously energizes at least one light (22) when a source of electrical energy (10) such as an alternator supplies electrical energy to the circuit (36) and the ignition switch (14) is in a first operating state for rendering the engine of the vehicle operable. At least one light (22) is automatically illuminated whenever the engine is running, regardless of the time of day or night, regardless of whether the vehicle is in motion, and regardless of whether the operator remembers to activate the light switch (24).

13 Claims, 1 Drawing Sheet

AUTOMATIC ILLUMINATION CIRCUIT

TECHNICAL FIELD

The present invention generally relates to a lighting system for use on automotive vehicles and, more particularly, is concerned with apparatus and a method for automatically energizing at least one light on the vehicle for safety and display of the vehicle whenever an ignition switch is closed, regardless of whether the vehicle is in motion.

BACKGROUND ART

Studies have shown that the number of motor vehicle accidents can be substantially lowered if vehicles have their head lights and park lights illuminated whenever the vehicles are operated, regardless of the time of day or night. There are some requirements that head lights be on at all times that the vehicle is in operation, day and night, on selected road segments. Such tests may lead to the implementation of a requirement that at least head lights be activated when the vehicle is operating at all times.

The ability to automatically illuminate park lights and head lights on a vehicle whenever an engine-driven alternator provides electrical energy to them, regardless of the settings for various light switches, is a very desirable feature for safety reasons. It is also desirable to be able to illuminate automatically one or more display signs that may be associated with the vehicle. With such a feature, the owner of a vehicle may be assured that its lights are on, regardless of whether the operator of the vehicle has remembered to activate a light switch.

At this time, there are two known methods of operating an automatic vehicle illumination system. Following manual methods, the driver of a vehicle turns on his head lights with a manufacturer-supplied switch. This manual operation has to be performed each time the driver enters and leaves the vehicle. Alternatively, known automatic systems which operate without the driver's help become activated every time the vehicle is used, but such systems tend to be complex and expensive to install.

A system of this general type is described and illustrated in Mitchell U.S. Pat. No. 3,832,597. Mitchell discloses a supplementary light energizing means for compelling all of the running lights to be energized, with the exception of high beam headlights, day or night, whenever the ignition switch is placed in a running position and the transmission is set for forward drive.

However, certain disadvantages are implicit in the light control system of the Mitchell patent. First, there is a requirement that the transmission be set for forward drive. This may be inconvenient when the vehicle is stationary with its transmission set in a "park" position with the engine running. Particularly when the vehicle is parked along a thoroughfare, a vehicle owner should still be assured that its lights are on for safety reasons, regardless of whether the operator remembered to turn them on. Second, there is a need to have park lights illuminated, together with any lighted signs that may be associated with the vehicle; as well as head lights. Third, automatic illumination does not occur when the transmission is in "reverse." Therefore Mitchell's approach fails to provide safety when the vehicle is operating in a reverse direction because Mitchell's invention only addresses head lights, not park lights, at the front of the vehicle. Fourth, Mitchell's approach provides no protection in low voltage conditions where an alternator is off-line. In that condition, limited battery power is used to dissipate electrical energy through an unwanted automatic selection of head light illumination.

Consequently, a need exists for improvements in automatic vehicle illumination circuits of this general type which will result in greater reliability and safety.

It would be desirable to have a supplemental system of light control which, when combined with existing vehicle electrical systems, will necessarily ensure an active condition of head lights and park lights whenever the engine is running, regardless of whether the vehicle is in motion or whether the vehicle is being operated in reverse.

With an arrangement of this kind, there should no longer be any need to remember to extinguish the lights after the ignition is turned off, thereby avoiding unwanted battery drainage when manual extinction of the lights is overlooked.

It would also be desirable to have available a passive lighting safety and advertising illumination device which is unaffected by the vehicle operator. No longer would the operator need to remember to activate the lights or, even worse, turn them off when leaving the vehicle.

DISCLOSURE OF INVENTION

The present invention provides an automatic illumination apparatus and method designed to satisfy the aforementioned needs. The invention embodies a unique automatic illumination control circuit that is simple, compact, easy to install, and leaves untouched conventional vehicle electrical wiring systems. Further, the circuit of the present invention includes a low voltage protection feature which avoids unwanted drain on the electrical system in low voltage conditions.

Accordingly, the present invention relates to an apparatus and method for providing automatic illumination of at least one light on a vehicle. The method includes the steps of: (1) conducting electrical energy to the automatic illumination circuit from the ignition so that at least one light is energized whenever the ignition switch is closed and an engine-driven alternator supplies electrical energy to the circuit, regardless of the position selected for the driving transmission system, regardless of the settings used for the light switches, and regardless of the time of day or night; and (2) supplying electrical energy to a relay control apparatus within the automatic illumination circuit, the relay control apparatus including a resistor, a relay control mechanism, a plurality of pairs of normally open points, and means for grounding.

More particularly, the electrical energy supplying step includes: (1) delivering a resting voltage from a battery to the resistor, the resting voltage being insufficient to energize the relay control mechanism or to pass between the poles of either pair of normally open points; and (2) augmenting the electrical energy delivered by the battery with energy supplied by the engine-driven alternator so that current passes in an amount sufficient to energize the relay control mechanism and to the means for grounding, thereby causing the normally open points and completing a circuit to at least one light.

BEST MODE FOR CARRYING OUT THE INVENTION

Figure 1:
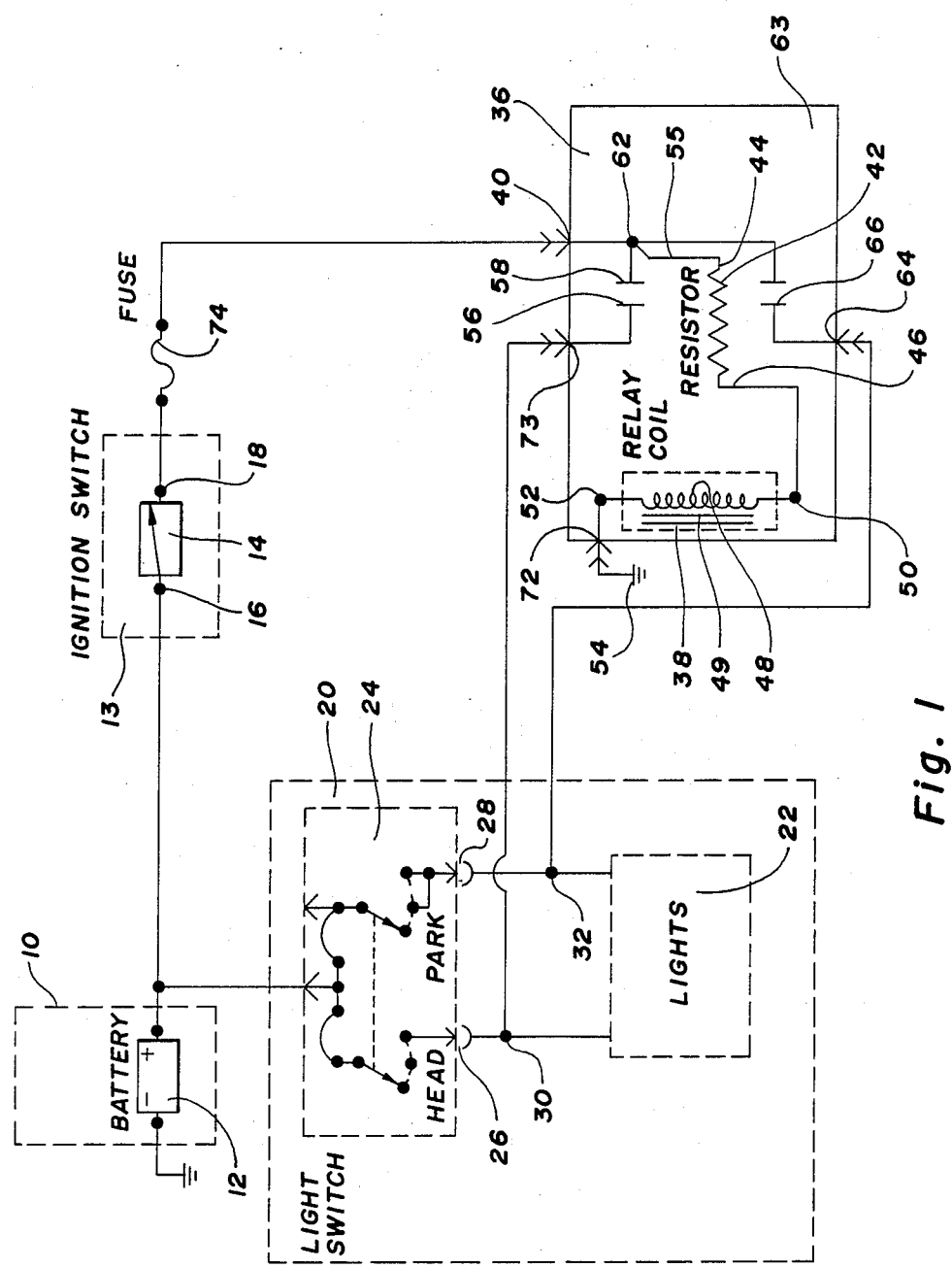
FIG. 1 is a schematic diagram of the circuitry of the automatic illumination apparatus of the present invention.

Referring now to FIG. 1, there is shown an automatic illumination circuit 36 which supplements conventional electrical wiring found in many automotive vehicles. In such vehicles, there is typically a source of electrical energy 10 including an alternator, and a battery 12. There is also an ignition system 13 including an ignition switch 14 which is coupled to the source of electrical energy 10. The ignition switch 14 is operable in a first operating state for rendering the vehicle's engine operable, and in a second operating state for rendering the engine inoperable.

Included in the conventional wiring of the vehicle is a lighting system 20 which is adapted to be energized by the source of electrical energy 10. As is well known, the lighting system 20 includes a light switch 24, including settings for park lights and head lights. Leading from the light switch 24 is a head light terminal 26 which typically connects to a high-low beam head light switch included within the general lighting system 22, which also includes head lights, park lights, and any lighted signs which may be associated with the vehicle.

The automatic illumination circuit of the present invention, generally designated with reference numeral 36 in FIG. 1, is coupled to the ignition switch 14 and to at least one light switch 24 for continuously energizing at least one light when the alternator 10 supplies electrical energy and the ignition switch 14 is in the first operating state.

The automatic illumination circuit 36 basically includes a first pair of normally open points 56 and a relay control mechanism 38. The first pair of normally open points 56 has a first pole 58 coupled to a resistor 42 and a second pole 59. The relay control mechanism 38 has a relay coil 48 including an electromagnet and a pivotable plate which is biased away from the electromagnet. The plate is mechanically connected to the first pair of normally open points 56 which are biased to an open position. When the relay coil 48 is supplied with sufficient electrical energy, the plate is urged toward the electromagnet and the first pole 59 come together thereby causing the first pair of normally open points 56. The second pole 59 of the open pair of points 56 couples to a head light terminal 26 at position 30. Coupled with the relay control mechanism 38 is a means for grounding, generally designated 54.

The resistor 42 lowers the voltage to a relay coil 48 in order to give low voltage protection. When the voltage supplied by the battery 12 is equal to or less than about 13 volts, the resistor 42 is selected so that the lights will not energize when the engine is started. In this state, all available electrical energy is then used to charge the battery 12. When the engine is running, if the engine-driven alternator 10 fails, and the voltage drops below about 13 volts, symptoms of this condition will be evident from a diminution in the intensity of illumination from the park lights and head lights, together with any indicators that may appear on the dashboard in the engine compartment. When the voltage drops below about 9 volts, the lights will become extinguished, and all electrical energy will be used to charge the battery.

In manufacturing the relay control mechanism of the present invention 38, a jumper 55, usually made of a steel wire, is connected between the first end node 44 of the resistor 42 and to the first pole 58 of the first pair of normally open points 56. The second end node 46 of the resistor 42 is connected to the first end terminal 50 of the relay coil 48.

The automatic illumination circuit 36 of the present invention is relatively easy to install. Connections are made to the vehicle fuse panel and to the head light and park light terminals 26 and 28, respectively, at positions 30 and 32, respectively. Completion of the installation requires a connection between the second end terminal 52 of the relay coil 48 and the means for grounding 54.

In a preferred embodiment of the automatic illumination circuit 36 represented by the circuitry of FIG. 1, the jumper 55 is coupled between the first end node 44 of the resistor 42 and a common connection point 62 with the first pole 58 of the first pair of normally open points 56.

As is readily apparent, one feature of the automatic illumination system 36 taught by the present invention is a fail-safe feature which is provided by there being no need to alter existing vehicle wiring. As a result, a vehicle operator may turn on park lights or head lights by pulling of a standard light switch. This allows the operator to simply activate the head light or park light switches conventionally if any component in the automatic illumination circuit 36 were to fail.

When the ignition switch 14 is in the first operating state for rendering the engine operable, and the engine-driven alternator 10 furnishes sufficient electrical energy to activate the relay control mechanism 38, the first pole 58 and second pole 59 of the normally open pair of points 56 meet and electricity is delivered to the head light terminal 26 at position 30 and to the lights 22, regardless of the settings of the light switch 24.

In operation, electrical energy is first conducted to the automatic illumination circuit 36 from the ignition switch 14. In practice, a fuse 74, usually rated at about 20 amps, is interposed between the ignition switch 14 and the automatic illumination circuit 36. When the ignition switch 14 is in the first operating state, a resting voltage is delivered by the battery 12 to the resistor 42, the resting voltage being insufficient to energize the relay control mechanism 38 or to pass between the poles of the normally open points 56. After the engine has started, the resting voltage is augmented when the engine-driven alternator 10 is activated. When this happens, current passes through the relay control mechanism 38.

The resistor 42 is selected so that when the battery 12 delivers less than about 13.2 volts when the engine is running, the relay control mechanism 38 is not energized and the head lights and park lights are not automatically energized by the illumination circuit. In this state, all electrical energy produced by the engine-driven alternator 10 is delivered to the battery 12 for charging. To accomplish this, the resistor 42 selected is usually rated at about 100 ohms plus or minus 2% and about 0.5 watts.

To energize the park lights, a second pair of normally open points 66 having a first pole 68 and a second pole 69 is coupled between the common connection point 62 and a park light terminal 28 at position 32. As with the first pair of normally open points 56, current only passes between the second pair of normally open points 66 when there is sufficient electrical energy to activate the relay control mechanism 38. When this happens, the contacts 49 associated with the relay control mechanism 38 are closed and through mechanical connection thereby close the second pair 66 of normally open points.

The relay control mechanism 38 includes a relay coil 48 which is adjusted so that when the voltage rises to about 12.8–13.2 volts, a gap between the electromagnet and the plate becomes closed by electro-mechanical force. Then, the second normally open points 66 are also closed, thereby completing the circuit.

It will readily be appreciated that the circuitry illustrated in FIG. 1 includes wiring to the head light terminal 26 at position 30 via the first pair of normally open points 56. In parallel, wiring is also shown to the park light terminal 28 at position 32 from the second pair of normally open points 66. If desired, parallel wiring can also be installed to one or more illuminated signs which can be associated with the vehicle.

In summary, the automatic illumination circuit 36 permits a vehicle to be operated with one or more lights on whenever the engine is running and the engine-driven alternator 10 supplies electrical power to the circuit 36. The circuit 36 of the present invention requires no manual operation after installation. Besides being easy to install, the circuit 36 offers the benefits of safety, improved advertising by lighted vehicle display systems, and does not require operator intervention beyond turning on the engine. Automatic illumination of at least one light by the circuit 36 occurs regardless of whether the vehicle is stationary, or is in forward or reverse motion.

It is thought that the automatic illumination circuit apparatus 36 and method of the present invention and many of its attendant advantages will be understood from the foregoing description. It will be apparent that various changes may be made in the form, construction, and arrangement of the parts thereof without departing from the spirit and scope of the invention or sacrificing all of its material advantages, or form of the herein before described merely preferred or exemplary embodiment.

While the best mode for carrying out the invention has been described in detail, those familiar with the art to which this invention relates will recognize alternative ways of practicing the invention as defined by the following claims.

What is claimed is:

1. In an automotive vehicle having a source of electrical energy, an ignition system including an ignition switch coupled to the source, the ignition switch being operable in a first operating state for rendering the engine operable, a lighting system adapted to be energized by the source, the lighting system including at least one light selected from the group consisting of at least one light, at least one park light and at least one illuminated sign, and at least one light switch coupled to the source for energizing the at least one light;

an automatic illumination circuit including a single relay control mechanism, said circuit coupled to the ignition switch and in parallel with the at least one light switch for continuously energizing the at least one light when the ignition switch is in the first operating state and the source supplies electrical energy to the automatic illumination circuit, the automatic illumination circuit further including a first pair of normally open points connected to the relay control mechanism including a relay coil, and a resistor coupled between the relay control mechanism and a pair of normally open points, the resistor decreasing the current flowing to the relay control mechanism, the relay control mechanism becoming energized and closing the first pair of normally open points when sufficient current is delivered to the relay coil, thereby delivering electrical current to the at least one light.

2. The automatic illumination circuit of claim 1, further including a jumper coupled between the resistor and the first pair of normally open points, and means for grounding for completing the circuit between the source, the ignition switch, the resistor, and the relay control mechanism when the first pair of normally open points are closed.

3. The automatic illumination circuit of claim 2, further including at least one pair of normally open points coupled between the resistor and the at least one light switch, each pair of normally open points being closed only when the potential difference therebetween exceeds a minimum value.

4. The automatic illumination circuit of claim 3, further including a common connection point between the ignition switch, one of the at least one pair of normally open points, and the resistor.

5. The automatic illumination circuit of claim 1, further including:
a resistor for decreasing the current flowing through the circuit, a relay control mechanism coupled to the resistor which becomes energized when sufficient current is delivered thereto;
means for grounding coupled to the relay control mechanism;
a first pair of normally open points coupled to the ignition switch, to the relay control mechanism, and to the at least one light switch;
a common connection point between the first pair of normally open points and the resistor; and
a second pair of normally open points coupled to the common connection point, to the relay control mechanism and to another light switch,
whereby the at least one light is automatically and continuously energized for safety and display of the vehicle without action by an operator of the vehicle, regardless of whether the vehicle is in motion.

6. In an automotive vehicle having an engine, a driving transmission system, an ignition switch which is selectively movable to a closed setting for rendering the engine operable, a lighting system including at least one light and at least one light switch for energizing the at least one light, and a source of electrical energy including an engine-driven alternator and a battery for energizing the ignition switch and the lighting system;
a method for automatically energizing the at least one light for safety and display of the vehicle whenever the ignition switch is closed, regardless of whether the vehicle is in motion, the method comprising the steps of:
conducting electrical energy to an automatic illumination circuit from the ignition switch; and
supplying electrical energy to a resistor within the automatic illumination circuit, a single relay control mechanism, a plurality of pairs of normally open points and means for grounding, so that at least one light is energized whenever the source supplies more than a predetermined voltage to the circuit, regardless of the position selected for the driving transmission system, regardless of the setting selected for the at least one light switch, and regardless of the time of day or night.

7. The method of claim 6, wherein the step of supplying electrical energy to the relay control mechanism comprises the steps of:
- delivering a resting voltage from the battery to the resistor, the resting voltage being insufficient to energize the relay control mechanism or to either pair of normally open points;
- augmenting the electrical energy delivered by the battery with energy supplied by the engine-driven alternator so that current passes through the relay control mechanism in an amount sufficient to energize the relay control mechanism, and to the means for grounding, thereby closing the pairs of normally open points; and
- completing the passage of electrical energy from the relay control mechanism to the at least one light.

8. The automatic illumination circuit of any of claims 2-5 wherein the resistor is selected so that when the source delivers less than about 13.2 volts, the relay control mechanism is not energized, and the at least one light is not automatically energized by the illumination circuit.

9. The automatic illumination circuit of claim 8, wherein the resistor selected is rated at about 100 ohms and about 0.5 watts.

10. The automatic illumination circuit of claim 8, wherein the relay coil is selectable.

11. The automatic illumination circuit of claim 10, wherein the relay coil of the relay control mechanism is selected so that when the voltage rises to about 12.8-13.2 volts and the relay coil is energized, at least one pair of the pairs of normally open points closes and the at least one light is automatically illuminated.

12. The automatic illumination circuit of claim 1, wherein the at least one light includes at least one illuminated sign attached to the vehicle.

13. In an automotive vehicle having such conventional features as an engine, a driving transmission system including a plurality of selectable positions, a source of electrical energy, an ignition system conductably energized from the source through an ignition switch, the ignition switch having a first and second end terminal, the ignition switch being selectably movable to a closed setting for entering the engine operable, a lighting system adapted to be energized by the source, the lighting system including at least one light and a light switch having a first end terminal connected to the source of electrical energy for energizing head lights and park lights, the light switch also including a head light terminal connected to the head lights, and a park light terminal connected to the park lights, and a high-low beam head light switch connected to the head light terminal, an automatic illumination circuit connected to the second end terminal of the ignition switch and to the head light and the park light terminals of the light switch for energizing the at least one light whenever the source applied electrical energy to the ignition system after the ignition switch is moved to a closed setting, regardless of the position selected for the driving transmission system, regardless of the setting selected for the light switch and the high-low beam head light switch, and regardless of the time of day or night, the circuit further including:
- a relay control mechanism coupled to the ignition switch;
- a resistor coupled to the relay control mechanism, the resistor having a second end node, the relay control mechanism having a first end terminal connected to the second end node of the resistor, and a second end terminal;
- means for grounding connected to the second end terminal of the relay control mechanism;
- a first pair of normally open points having a first pole and a second pole, the second connectable to the head light terminal of the light switch;
- a second pair of normally open points having a first pole and a second pole, the second pole connectable to the park light terminal of the light switch;
- a common connection point being adapted for connecting the first pole of the first pair of normally open points, the first pole of the second pair of normally open points, the first end node of the resistor and a second end terminal of the ignition switch; and
- a fuse interposed between the second end terminal of the ignition switch and the common connection point, whereby the at least one light is automatically energized for safety and display of the vehicle without further action of an operator of the vehicle after the ignition is moved to the closed setting, regardless of whether the vehicle is in motion.

* * * * *